Figure 1:
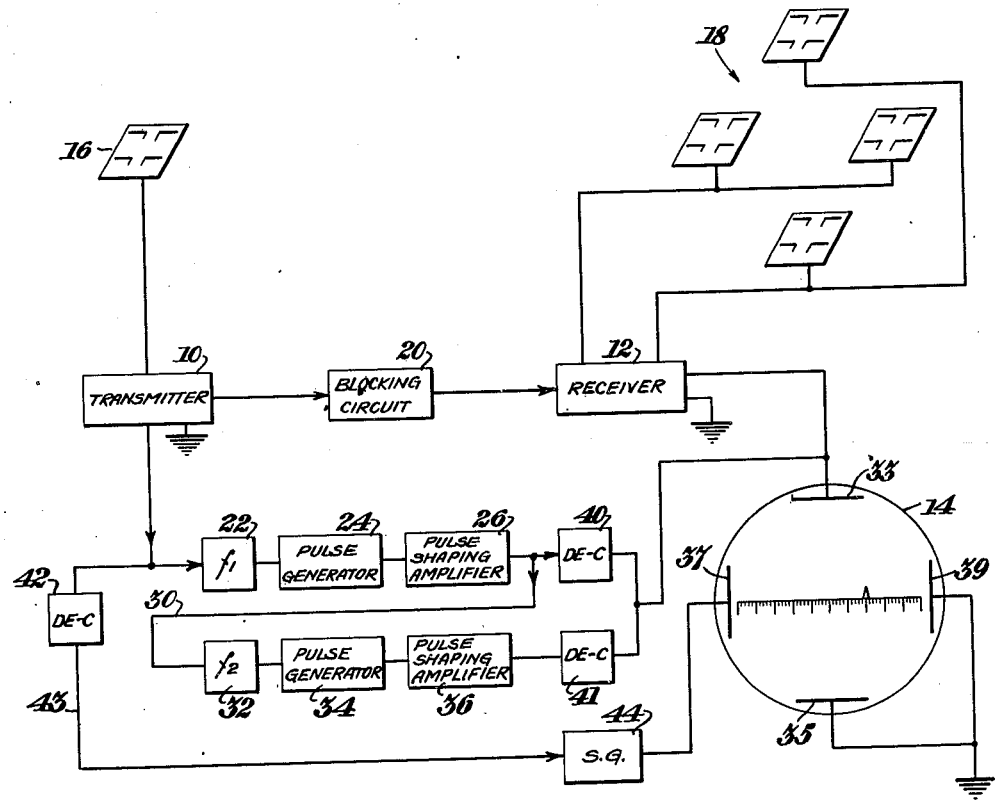

June 28, 1949.  H. G. BUSIGNIES  2,474,219
PULSE GENERATING SYSTEM
Filed Sept. 14, 1942  3 Sheets-Sheet 1

INVENTOR
HENRI G. BUSIGNIES
BY Percy P. Lantz
ATTORNEY

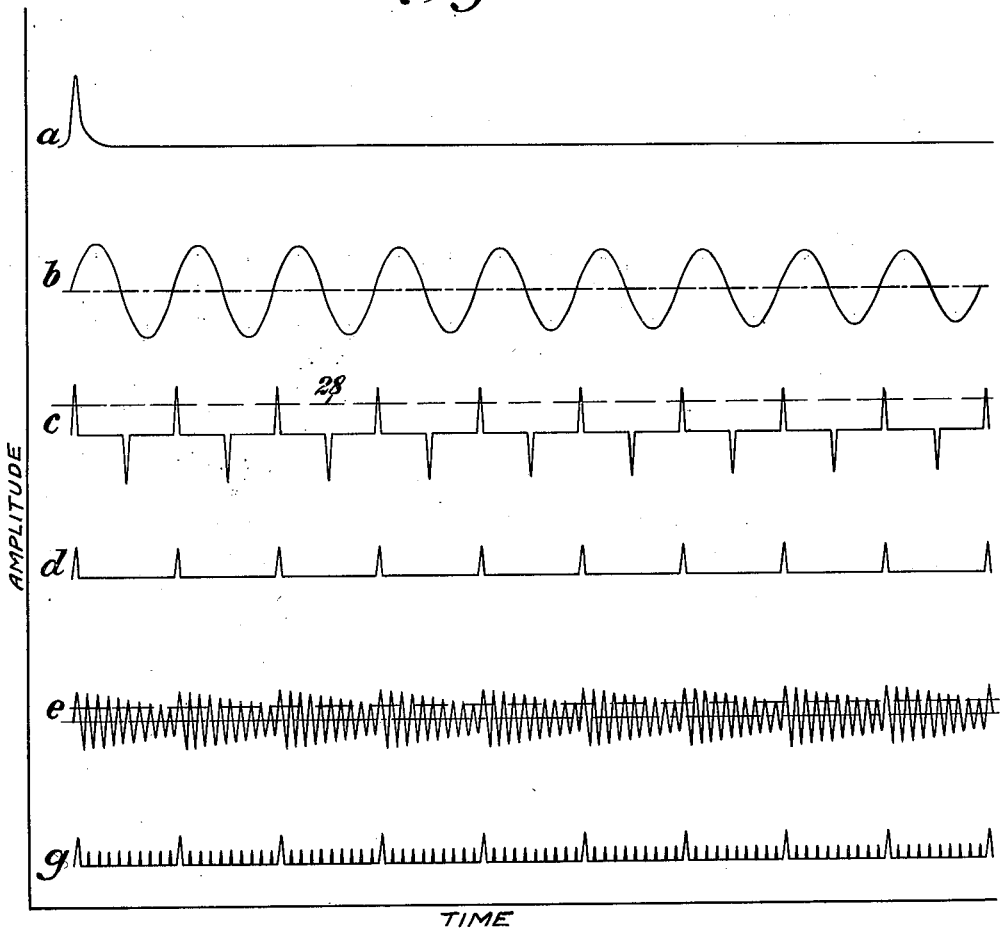

June 28, 1949.   H. G. BUSIGNIES   2,474,219
PULSE GENERATING SYSTEM
Filed Sept. 14, 1942   3 Sheets-Sheet 3
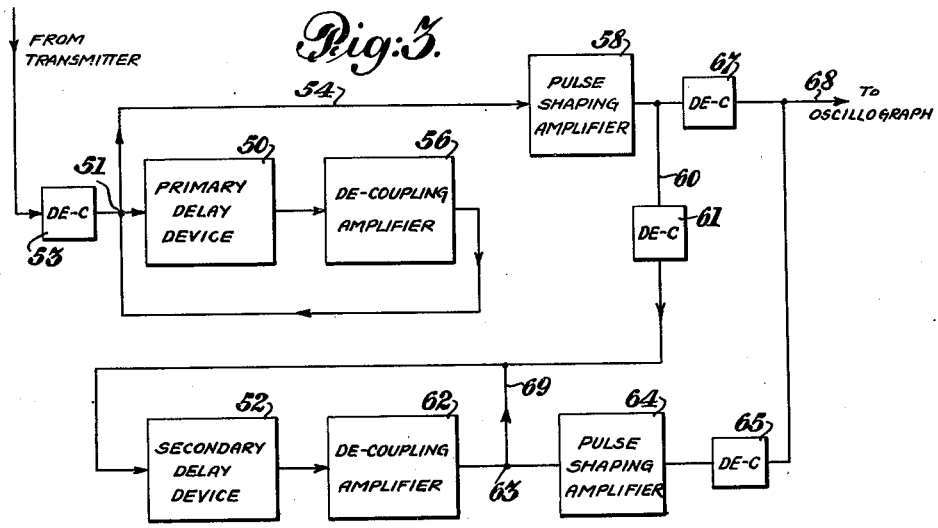
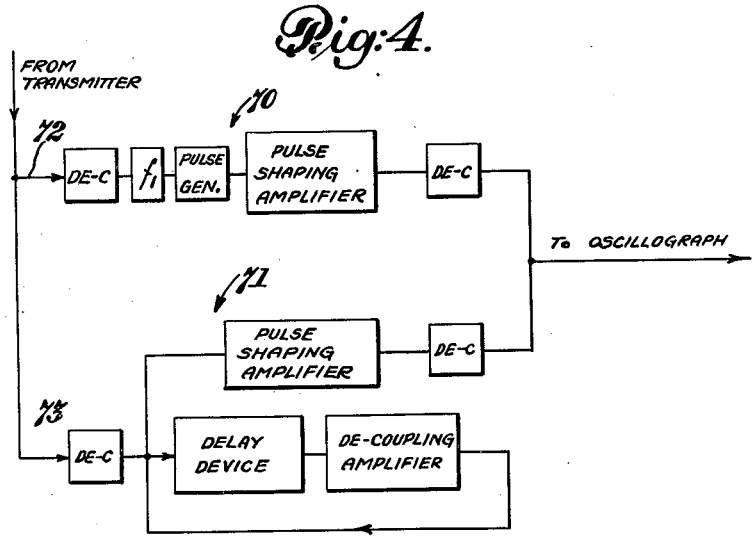
INVENTOR
HENRI G. BUSIGNIES
BY
ATTORNEY Patented June 28, 1949

2,474,219

UNITED STATES PATENT OFFICE 2,474,219

PULSE GENERATING SYSTEM

Henri G. Busignies, Forest Hills, N. Y., assignor to Federal Telephone and Radio Corporation, a corporation of Delaware Application September 14, 1942, Serial No. 458,191

9 Claims. (Cl. 315—22)

This invention relates to radio obstacle detection apparatus such as used for detecting hostile aircraft and ships, and more particularly to pulse generation such as may be used for scale calibration of the oscillograph or oscillographs used for echo pulse indications of the presence of aircraft or ships or other obstacles within the range of the detection apparatus.

I have disclosed such an obstacle detection system in my copending application Serial No. 381,640, filed March 4, 1941, to which this invention is applicable. Such a detection system is particularly adaptable where highly accurate timing intervals are desired as, for example, in identifying and indicating the position and movement of fast moving aircraft. The distance to a detected aircraft, and the elevation and azimuth of its position, are indicated on one or more cathode ray tubes. This is accomplished by transmitting recurrent signals or electromagnetic impulses which, when reflected back by aircraft or other obstacles, are received and indicated by the apparatus as echo impulses. The time interval between the transmission of an impulse and the reception of an echo pulse caused by an obstacle in response to such impulse is used to determine the distance to the obstacle. The echo pulse or pulses, as the case may be, are indicated on a time basis on the oscillograph screen and the distance represented by its location with respect to a given reference point is determined by using an adjustable local reference pulse.

It has been proposed heretofore to assist in determining the distance to an echo producing obstacle by providing the oscillograph with a scale by means of pulses produced by a stabilized pulse generator. The frequency of recurring pulses transmitted by the detection apparatus, however, is not always steady and in fact may vary undesirably with respect to the frequency of the scale pulses. It is one of the objects of this invention, therefore, to provide a method and apparatus to produce an accurate scale calibration for the oscillograph in response to recurrent impulses whether or not the frequency of the recurrent impulses is steady or unsteady.

Another object of this invention is to provide a method and apparatus for calibrating a scale for an oscillograph of radio detection apparatus whereby accurate range measurement is provided for echo reception produced by steady or unsteady transmission of recurrent impulses.

Still another object of this invention is to provide a method and means for producing in response to each recurring pulse either of steady or unsteady frequency, one or more series of pulses having predetermined spacing between the adjacent pulses of each such series.

The features of this invention by which the above and other objects of the invention are accomplished comprise generating a series of pulses in accordance with the occurrence of each of the transmitted impulses, the generated series of pulses having a frequency such that the pulses thereof may be used as major scale division markers or for any other purpose requiring a series of pulses having predetermined and equal spacing therebetween. A second series of pulses may also be generated in response to each of the recurrent impulses or to each of the major scale pulses, whichever procedure is preferred, at a frequency which is a multiple of the frequency of the major pulses. Such a second series of pulses may be used as minor division markers for the scale. A third series of pulse markers at still a higher frequency may be provided for use as still finer scale divisions decimal markers.

There are several possible variations in the manner of generating the different pulses which form the major, minor and decimal markers of the scale. One of the methods may comprise the generation of a slightly damped wave train in response to each of the recurring transmitted impulses, then generating in response to each half cycle of the wave train a narrow pulse. These pulses will be alternately disposed in opposite directions, positive and negative, and by using a suitable pulse shaping amplifier unidirectional pulses can be provided therefrom for use as scale markers to indicate the major divisions of the scale. This operation may be repeated to provide minor and decimal scale markers by generating second and third wave trains each having a frequency which is a multiple of the frequency of the wave train from which the major pulses are generated.

Another method by which the division markers of the scale may be generated comprises a series of steps of dividing pulses, using one part thereof as a scale marker and retarding the other part to provide a delayed pulse to be divided by the next step. This provides a series of pulses with predetermined time intervals therebetween. The time interval may be varied in accordance with the delay characteristics of the system. To provide major and minor pulse markers, the series of pulses forming the major markers are subjected to a delaying action of a predetermined time interval and the series of pulses forming minor markers are subjected to a different delaying action, the time interval of which is determined by a frequency which is a multiple of the frequency of the major pulses. The second series, therefore, will provide small divisions between the pulses of the major divisions of the scale. A third and even a fourth series of still smaller markers may be provided by using still shorter delay periods. Also, tuned circuits may be used in combination with delay means to produce the different scale markers.

Regardless of whether two or more tuned circuits or two or more delay lines or a combination of tuned circuits and delay lines are used for generation of the major, minor and/or decimal pulse markers, each series of markers may be limited differently in amplitude for easy scale reading. Furthermore, since the scale calibrating pulses are generated in response to each of the transmitted impulses, the resulting scale is accurate for each echo pulse even though the transmitted impulses may vary in frequency. Therefore, an echo appearing on the oscillograph can always be accurately measured from the accompanying scale.

For a more complete understanding of the methods of this invention, reference may be had to the following detailed description of several forms of apparatus by which the methods may be practiced, the detailed description to be read in connection with the accompanying drawings, in which Fig. 1 is a schematic block diagram of a radio detection apparatus having one form of calibrating apparatus in accordance with this invention;

Fig. 2 is a graphical illustration of a series of curves illustrating the steps by which major and minor pulse markers are generated; and Figs. 3 and 4 are block diagrams of additional forms of apparatus in accordance with this invention.

Referring to Fig. 1 of the drawings, the radio detection apparatus therein shown, which is similar to that of my aforesaid copending application, comprises a transmitter 10, a receiver 12 and an oscillograph 14. The transmitter and receiver are provided with antennae 16 and 18 which are preferably mounted for manipulation to permit directive scanning. The transmitter and the receiver may be interconnected with the usual blocking circuit 20 whereby the receiver is blocked during the transmission of radio detection impulses.

The form of calibrating system of this invention shown in Fig. 1 comprises a tuned circuit 22 which is tuned for resonance at a frequency $f_1$. The frequency $f_1$ is preferably chosen to provide ten scale divisions covering a total range of say 100,000 yds. This tuned circuit preferably has a high "Q" and is adapted to be shock excited by the application of a pulse of energy from the transmitter 10 simultaneously with the transmission of a radio detection impulse. This shock excitation causes the circuit 22 to oscillate at the frequency $f_1$.

The wave train thus produced is applied to a pulse generator 24. The pulse generator may be of any known form, for example, of the type disclosed in the copending application of E. Labin and D. Grieg, Serial No. 429,376, filed February 3, 1942 issued September 24, 1946 as Patent 2,408,078. The pulse generation will be clear from an inspection of Fig. 2. The curve $a$ indicates the energy or detection pulse which is simultaneously transmitted into space to detect an airplane or obstacle, and applied to the tuned circuit 22. The sinusoidal curve $b$ represents the slightly damped wave train generated by the tuned circuit 22. The pulse generator 24 provides a series of narrow pulses one for each half cycle of the wave train $b$. These pulses are represented by the curve $c$. In order to select uni-directional pulses and so shape them as to provide narrow pulses having the same amplitude such as indicated by the line 28, the pulses thus generated (curve $c$) are passed through a pulse shaping amplifier 26 which may include a limiter, gain control, an attenuator, or a potentiometer or a combination thereof. This operation as shown by curve $d$ provides a series of unidirectional pulses of constant amplitude. These pulses form the major markers of the scale and the space therebetween may, for example, represent a distance of 10,000 yards. This spacing of the major pulses is determined by the frequency of the tuned circuit 22.

In order to provide minor markers for the scale, a second tuned circuit 32 is provided and pulses such as indicated by the curve $d$ (Fig. 2) are applied thereto as indicated by the connection 30. The tuned circuit 32 is preferably tuned at a frequency $f_2$ which is a multiple of the frequency $f_1$, that is, some multiple such as ten times the frequency $f_1$. This provides ten minor divisions between adjacent major pulses as indicated by the curve $e$. The wave train generated by the tuned circuit 32 is in turn applied to a pulse generator 34 and a pulse shaping amplifier 36 whereby the minor pulses are generated similarly as described in connection with the major pulses. Since the wave trains of circuits 22 and 32 are damped to a certain degree, any variation in the frequency of recurring detector impulses or variation between the occurrence of each detector impulse and the phase of the previous wave train will not appreciably affect the amplitude of successive wave trains. The detection impulses are usually transmitted in the order of 60 per second. It will, therefore, be understood that the major pulse generations occur practically instantaneously insofar as visual view of the oscillograph is concerned. These two series of pulses are then passed through decouplers 40 and 41 such, for example, as a buffer tube whereby the flow of energy therethrough is unidirectional and applied to the vertically disposed plates 33 and 35 of the oscillograph 14. The resulting scale thus calibrated in response to the transmission of recurrent impulses by the transmitter T is substantially as indicated by the curve $g$ (Fig. 2).

In order to provide a time basis for the scale, pulse energy flows from the transmitter 10 through a decoupler 42 and a line 43 to a sweep generator 44 which controls the trace line on the oscillograph 14 as determined by the horizontally disposed plates 37 and 39.

If desired, a third tuned circuit, pulse generator, and pulse shaping amplifier may be provided to produce additional pulses to represent, for example, decimal markers or, where a vernier oscillograph is used as described in my aforementioned copending application, the minor divisions may be again divided by 10 thereby making one-thousand divisions for the total range of the detection apparatus.

Referring to Fig. 3 of the drawings, the calibration of the scale may be accomplished by the provision of a primary delay device 50 and the secondary delay device 52. The current pulse energy as transmitted by the transmitter 10 (Fig.

1) is passed through a decoupler 53 to the input 51 of the delay device 50. The pulse energy is here divided, one part being passed over connection 51 as an initial pulse marker and the other part being passed to the delay device 50. The delay device 50 retards the pulse energy introduced therein a predetermined time interval and thereafter permits it to flow through a decoupling amplifier 56 back to the input 51. This delayed pulse energy is again divided, one part passing on as a second scale marker and the other part re-entering the delay device 50. This process continues until a series of pulse markers are provided for the oscillograph 14. The spacing of these pulses are determined by the delay characteristics of the device 50 and may be such as to provide a predetermined number of major markers. These major pulses, of course, are properly shaped before they are applied to the oscillograph by passing them through a pulse shaping amplifier 58.

To provide a series of minor markers between adjacent major pulse markers each of the major pulses is applied over a connection 60 through a decoupler 61 to the secondary delay line 52 and thence to a suitable decoupling amplifier 62. The delayed pulse is then divided at 63, part of the pulse energy being passed through a pulse shaping amplifier 64, a decoupler 65 and thence to the oscillograph connection 66. This minor pulse follows the major pulse from which it was derived, the major pulse having previously passed through decoupler 67 to the oscillograph connection 68. The other part of the pulse energy is returned by circuit 69 to the delay device 52 and the process repeated a number of times. The series of pulses thus generated are in accordance with the delay characteristics of the secondary delay device 52. The delay interval of the primary delay device 50 is preferably a multiple of the delay interval of the secondary delay device so that the pulses generated by the latter are minor pulse markers which fall between the adjacent major pulse markers generated by the former. The energy absorbing charactristics of the devices 50 and 52 are usually such as to damp out the pulse energy by the time another impulse is received from the transmitter.

In Fig. 4 I have shown another arrangement involving a shock excitable tuned circuit unit 70 along the lines of the form shown in Fig. 1 by which major pulse markers are generated and a delay circuit unit 71 along the lines of the form shown in Fig. 3 by which minor pulse markers are generated. The recurrent impulses from the transmitter is applied directly to each of the two circuits as indicated at 72 and 73, the generation of pulses in the circuit 71 being at a multiple of the pulse generation of circuit 70. If desired the tuned frequency circuit may be used for generation of minor pulse markers, but if shock excited by the recurrent impulses from the transmitter, it will necessarily have to have a very high "Q" to provide a wave train of sufficiently sustained amplitude for generation of minor pulses for the complete scale.

While the forms shown in Figs. 1 and 3 use major pulses for the generation of minor pulses, it will be understood that the recurrent detection impulses from the transmitter may be used for this purpose similarly as shown in Fig. 4.

If desired the minor pulses may be produced in the form shown in Fig. 1 by replacing the circuit 23 with a circuit adapted to respond to one of the harmonics such as the 10th of the frequency $f_1$ of circuit 22. This harmonic may then be passed through the pulse generator 34 and the pulse shaping amplifier 36 to produce minor pulses.

From the foregoing it is clear that the several forms of apparatus shown and described provide for the generation of major and minor series of pulses in response to each transmitted impulse so that an accurate calibrated scale is provided for the oscillograph regardless of whether the frequency of the impulses is steady or not. It will also be clear that any number of series of pulses may be provided and applied for use with panoramic and vernier oscillographs such as disclosed in my aforesaid copending application for accurate measurement of the location of pulse echoes indicated thereon in accordance with radio detection operation. Thus, it will be recognized that many variations in both the methods and the forms of apparatus by which the methods may be practiced are possible without departing from the invention. It is to be understood, therefore, that the methods and forms shown and described herein are to be regarded as illustrative of the invention only and not as restricting the appended claims.

What I claim is:

1. In a system for providing a calibrated scale for an oscillograph to cover a desired portion of the interval between successive impulses of a source of recurring impulses, wherein the scale is produced by generating two series of pulses in response to each of said recurring impulses, the first of said series of pulses having a frequency such that the pulses provide major scale division markers and the second of said series of pulses having a frequency which is an integral multiple of the frequency of the first-mentioned series, thereby providing minor division markers for the scale, the method of producing said pulse series comprising generating one of the series of pulses by exciting a circuit to provide a wave train, and producing in response to each cycle of the wave train one of the pulses comprising said one series, and generating other of the two series of pulses by dividing the recurring impulse energy, retarding one part thereof to provide the second pulses of the series, repeating the division and retarding process on each such delayed part of the pulse energy, and applying the series of pulses providing major and minor scale division markers to the oscillograph.

2. A method of producing a calibrated scale for an oscillograph to cover a desired portion of the interval between successive impulses of a source of recurring impulses, which includes the steps of causing each of said impulses to excite the generation of a wave train at a given frequency, generating in response to each half cycle of the wave train a narrow pulse wherein adjacent pulses are disposed in alternate directions, blocking the pulses disposed in one of the directions to thereby leave a series of unidirectional pulses which are used to produce major scale division markers, causing said major division defining pulses to excite the generation of a second wave train at a frequency which is an integral multiple of said given frequency, producing in response to said second wave train a series of unidirectional pulses to provide pulses defining minor divisions for the spaces between the major pulses, and applying both of said series of pulses to the oscillograph to produce major and minor scale division markers.

3. Scale producing apparatus for cathode ray tubes and the like having two pairs of controlling plates, including a source of recurring pulses, means generating a first series of pulses of a greater frequency and over a period less than the frequency of and the period between said recurring pulses, means generating a second series of pulses of a greater frequency and over a period substantially equal to the frequency of and the period between the pulses of the first series, means initiating the generation of the first series of pulses by each of the said recurring pulses, means initiating the generation of the second series of pulses by each of the pulses of the first series, means simultaneously applying all of the pulses across one pair of the plates of the cathode ray tube, and sweep generator means triggered by said recurring pulses and connected across the other pair of plates of the cathode ray tube.

4. The combination according to claim 3, in which the means for generating the first series of pulses comprises a first delay device connected to the recurring pulse source, decoupling means connecting the output of said first delay device back to the input thereof as well as across the one pair of plates of the cathode ray tube, and in which the means for generating the second series of pulses comprises a second delay device connected to the output of both the recurring pulse source and the first-generating means, and decoupling means connecting the output of said second delay device back to the input thereof, as well as across the said one pair of plates of the cathode ray tube, the time constant of said second delay device being of such a value relatively to the time constant of said first delay device to produce a series of pulses substantially equally dividing the period between the pulses of the first series.

5. Apparatus as defined in claim 3 wherein the pulse generating means comprises two tuned circuits shock excitable in response to applied pulses to generate a wave train each, and means associated with each of said circuits to produce in response to the wave train generated therein a series of uni-directional pulses.

6. Apparatus to provide a calibrated scale for an oscillograph to cover a desired portion of the interval between successive impulses of a source of recurring discrete impulses comprising a tuned circuit shock excitable in response to each recurring impulse to generate a wave train, means for producing limit in response to each cycle of the wave train at least one pulse of a given polarity to thereby provide a series of major pulses of the same polarity for use as division markers for the scale, a second tuned circuit shock excitable in response to said major pulses, said second circuit having a frequency which is an integral multiple of the frequency of the first mentioned circuit, means for producing in response to each cycle of the wave train produced in said second circuit at least one pulse of the aforesaid polarity to thereby provide a second series of pulses of the same polarity as minor division markers for the scale, and means for applying both series of pulses to said oscillograph to produce major and minor scale division markers.

7. Apparatus to provide a calibrated scale for an oscillograph to cover a desired portion of the interval between successive impulses of a source of recurring discrete impulses comprising a circuit having a delay device, said circuit responding to one of said recurring impulses applied thereto to provide a series of pulses having a frequency determined by the delay characteristics of said device to provide pulses defining major divisions for the scale, a second circuit having a delay device shorter than the first mentioned delay device to provide a second series of pulses at a frequency which is an integral multiple of the first series of pulses, and means for applying both of said series of pulses to said oscillograph, whereby a series of minor pulse markers are provided between adjacent major pulse markers.

8. In combination, a cathode ray device having a viewing screen, an oscillatory circuit, means to deflect the ray of said device across said screen and simultaneously to excite said circuit, means to produce sharp spaced indicia on said screen, said means comprising means to generate a damped train of oscillations in response to each cycle of oscillations in said circuit, and means to modulate the ray of said device during its deflections in accord with the successive peaks of said recurring trains of oscillations which exceed a predetermined amplitude.

9. In combination, a cathode ray device having a viewing screen, an oscillatory circuit, means to deflect the ray of said device across said screen in a predetermined period and to excite oscillations in said circuit having the natural period thereof, means to produce sharp spaced indicia on said screen, said means comprising means to generate a highly damped train of oscillations in response to each cycle of oscillations in said circuit, and means to modulate the ray of said device in accord with one peak of each of said trains to produce said equally spaced indicia, said natural period being related to the rate of deflection of said beam to produce desired spacing of said indicia.

HENRI G. BUSIGNIES.

REFERENCES CITED

The following references are of record in the file of this patent:

UNITED STATES PATENTS

| Number | Name | Date |
| --- | --- | --- |
| 1,756,131 | Ohl | Apr. 29, 1930 |
| 1,908,249 | Hund | May 9, 1933 |
| 2,000,362 | Terman | May 7, 1935 |
| 2,086,918 | Luck | July 13, 1937 |
| 2,101,520 | Tolson et al. | Dec. 7, 1937 |
| 2,103,090 | Plebanski | Dec. 21, 1937 |
| 2,121,359 | Luck et al. | June 31, 1938 |
| 2,178,074 | Jakel et al. | Oct. 31, 1939 |
| 2,207,267 | Plaistowe | July 9, 1940 |
| 2,208,376 | Luck | July 16, 1940 |
| 2,208,378 | Luck | July 16, 1940 |
| 2,221,115 | Shepard, Jr. | Nov. 12, 1940 |
| 2,227,598 | Lyman et al. | Jan. 7, 1941 |
| 2,234,830 | Norton | Mar. 11, 1941 |
| 2,312,761 | Hershberger | Mar. 2, 1943 |
| 2,313,966 | Poch | Mar. 16, 1943 |
| 2,320,576 | Schrader et al. | June 1, 1943 |

FOREIGN PATENTS

| Number | Country | Date |
| --- | --- | --- |
| 406,903 | Great Britain | Mar. 8, 1934 |